No. 706,534. Patented Aug. 12, 1902.
J. DAWSON.
VEHICLE FRAME.
(Application filed May 22, 1901.)

(No Model.) 2 Sheets—Sheet 1.

Witnesses. Inventor.
Walter B. Payne. James Dawson
G. Willard Rick. by Frederick F. Church
his Attorney.

THE NORRIS PETERS CO., PHOTO-LITHO., WASHINGTON, D. C.

No. 706,534. Patented Aug. 12, 1902.
J. DAWSON.
VEHICLE FRAME.
(Application filed May 22, 1901.)
(No Model.) 2 Sheets—Sheet 2.
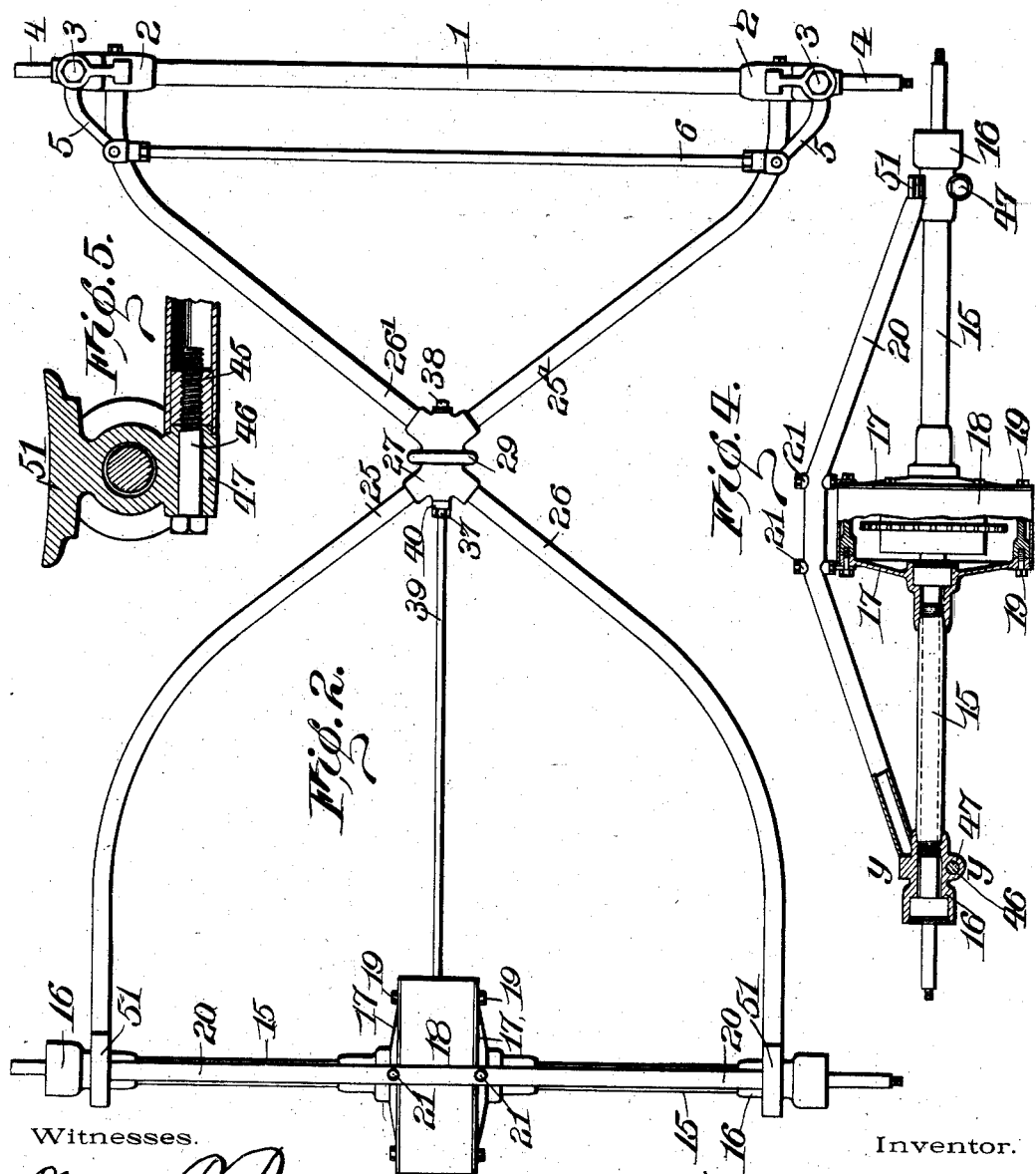

UNITED STATES PATENT OFFICE.

JAMES DAWSON, OF ROCHESTER, NEW YORK.

VEHICLE-FRAME.

SPECIFICATION forming part of Letters Patent No. 706,534, dated August 12, 1902.

Application filed May 22, 1901. Serial No. 61,371. (No model.)

*To all whom it may concern:*

Be it known that I, JAMES DAWSON, of Rochester, in the county of Monroe and State of New York, have invented certain new and useful Improvements in Vehicle-Frames; and I do hereby declare the following to be a full, clear, and exact description of the same, reference being had to the drawings forming a part of this specification and to the reference-numerals marked thereon.

My present invention has for its object to provide an improved frame adapted particularly to be employed in the construction of automobiles and similar vehicles that may be constructed of light material and capable of withstanding severe strains and which will permit an independent movement of the forward and rear axles.

As a further object my invention provides a combination of parts or elements which are so constructed that they may be interchangeable and their attachment easily accomplished to form a whole frame of exceptional rigidity to withstand the shocks to which it may be subjected.

With these ends in view my invention also embodies the construction and combination of elements hereinafter set forth, and more specifically designated in the claims at the end of this specification.

Figure 1:
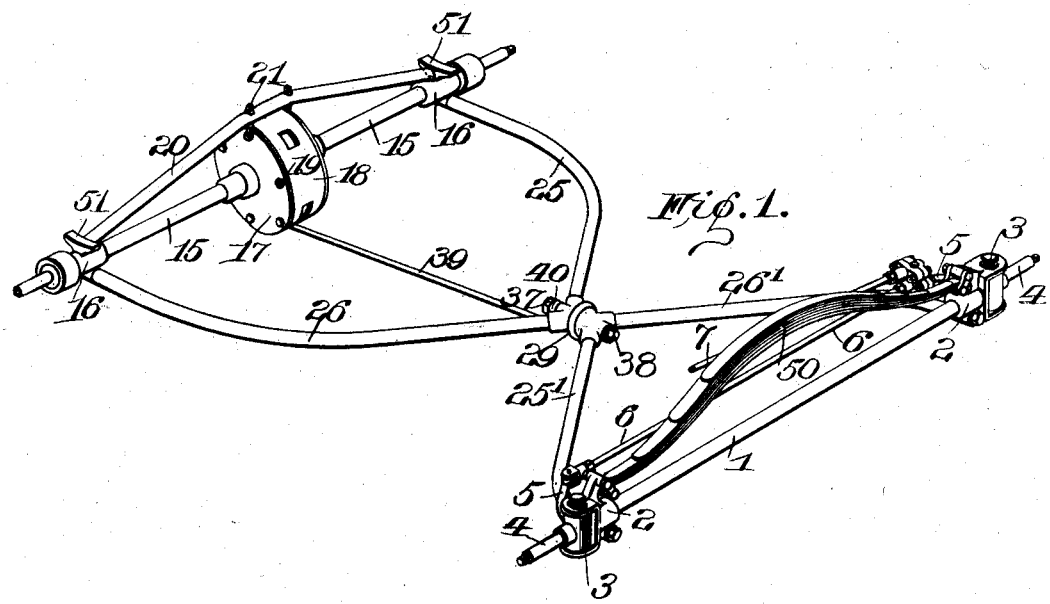
Figure 3:
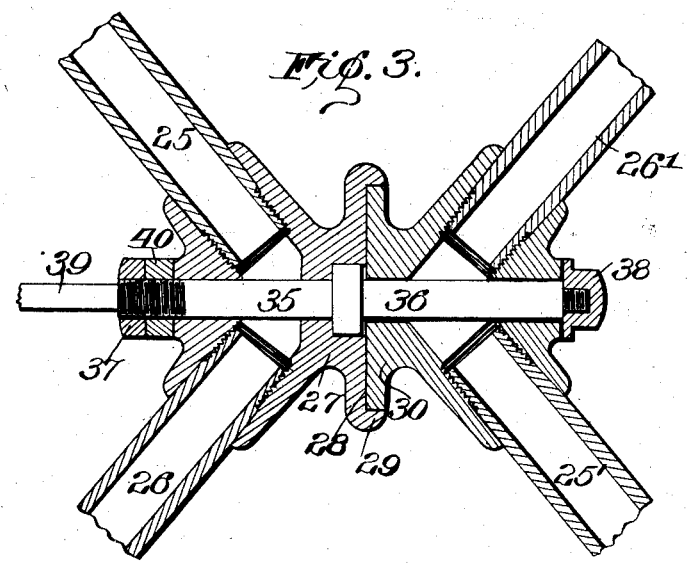

In the drawings, Figure 1 is a perspective view of a vehicle-frame constructed in accordance with my invention. Fig. 2 is a top plan view thereof. Fig. 3 is a horizontal sectional view on the line $x\,x$ of Fig. 2 through the swivel connection of the frame. Fig. 4 is a view, partly in section, of the rear-axle support; and Fig. 5 is a sectional view on the line $y\,y$ thereof.

Similar reference-numerals in the several figures indicate similar parts.

The frame embodies a front bar 1, constituting the forward axle, having upon each end the bracket or yoke castings 2, in which are pivoted on bolts 3 the short studs or axles 4, adapted to receive the front wheels, and provided upon the rear side of their pivots with arms 5, which may be connected for simultaneous adjustment by a bar 6 and to the usual steering apparatus by a bar or connection 7. The rear end of the frame is adapted to receive the driving-axle of the usual type, composed of two sections attached at their outer ends to the rear wheels and at their inner proximate ends connected by differential gearing which permits either of said wheels to be independently revolved. These operating parts are inclosed, and the revoluble shafts extend through tubes or hollow shafts 15, attached at their outer ends to castings or journal-boxes 16, in which the shafts are revolubly supported, and at their inner ends to disks 17. The latter form the sides of a chamber or box for the coöperating gear-wheels between the separate driving-shafts, and between their outer edges is the shell 18 and the connecting-bolts 19. Also extending over the top of the chamber or box is a truss-bar 20, attached at its opposite ends to the journal-boxes 16 and at its central portion to the disks 17 by bolts 21.

The forward and rear portions of the running-gear are attached by a connecting-frame, in which is arranged a swivel, whereby an independent tilting movement is permitted the forward and rear wheels to accommodate them to the irregularities in the road-bed without straining other parts of the machine, and in the present instance I accomplish this object by attaching the frame members or reaches in the form of tubes or rods 25 and 26 to the rear journal-boxes 16 and uniting their forward ends in a casting or bracket 27, having a vertically-extending face 28, surrounded upon its outer edge by a rim 29. Bearing against the latter is a similar swivel member 30, from which extend the diverging tubes or rods 25' and 26', forming continuations of the reaches, attached at their outer ends to the yokes 2 on the ends of the front bar or axle 1. The swivel members and the two parts of the frame thus formed are united by means of a bolt 35, provided with a collar 36 and rigidly secured to the member 27 by the nut 37, its outer end forming a bearing for the member 30, which is secured against removal by the nut 38, the advantage of this construction being that the forward and rear portions of the frame may be detached by simply removing the nut 38, the bolt 35 forming a rigid stud or projection on one of the swivel connections, and also as the nut 38 when in position is seated against the shoulder on the end of the bolt, as shown, it is prevented from binding the swivel members to cause undue friction between them. The tubes or rods 25 25' and 26 26' extend in substantially diagonal lines to connect the front and rear portions of the frame, and at the point where said lines cross is located the swivel above described. This arrangement provides for the independent movement of the axles in vertical parallel planes, and the position of the frame members 25 25' and 26 26' is such that either direct or side strains, such as caused by the impact of a single wheel with an obstruction, are transferred in a direct line from the end of one axle to the opposite end of the other. 39 indicates a tie-rod, having at one end an eye 40, by means of which it is secured to the swivel member 27 between the latter and the nut 37, and at its opposite end it is attached to the lower side of the shell 18 on the gearing-box.

In the construction of the frame I have described I preferably employ tubing and unite the various parts in such a manner that they may be readily interchanged and in case of accident new parts inserted without a dismemberment of the entire vehicle. Wherever it is possible, I taper the ends of the tubing slightly and provide said ends with a thread adapted to coöperate with the interior tapered and threaded apertures formed in the various castings to which the ends of the tubes are secured, as shown particularly in the enlarged sectional view, Fig. 3. The tubes 25 25' and 26 26' are secured in their respective swivel members in the manner above described, and I therefore employ a different connection between their ends and the forward and rear portions of the frame. In the outer end of each of the said tubes I secure a plug 45, provided with a threaded central aperture adapted to be engaged by a bolt 46, passing through a lug 47, formed upon each of the yokes 2 and the journal-boxes 16. The plug 45 is secured within the tube, so that the end of the latter projects beyond its forward end and is adapted to snugly embrace a stud or boss 48, formed on the face of the lug 47.

The usual body-springs may be mounted on the frame, and in Fig. 1 I have shown the springs 50 attached to the forward portion of the frame; but upon the rear portion I have only shown the spring-seats 51, formed on the journal-boxes 16.

Frames constructed as above described are particularly adapted to be employed upon motor-vehicles, and the method of uniting the various parts greatly facilitates assembling them, and, if it is desired, the parts may be readily detached without marring the painting or decorative finishing.

I claim as my invention—

1. In a vehicle-frame, the combination with a forward axle having reach members extending rearwardly from its ends and united in a swivel member, and a rear axle having similar reach members extending forwardly and united in a second swivel member adapted to coöperate with the first member, of a bolt extending through the two members having a shoulder thereon engaging one side of one of the members and means on the bolt for engaging the opposite side of said member to secure it rigidly thereon and a nut on the bolt engaging the outer side of the other member to secure it in position.

2. In a vehicle-frame, the combination with the forward and rear axles having the projecting ears or lugs provided with the projecting faces, of the reach-frame extending between the axles adapted to abut against the lugs and having the recessed ends receiving the faces on the lugs and detachable connections between the latter and the reach members.

3. In a vehicle-frame the combination with the forward and rear axles having the lugs thereon provided with the projecting faces, of the reach-frame extending between the axles having the recessed ends adapted to abut against the lugs and receive the projecting faces thereon, and securing devices extending through the lugs and engaging the interior of the reach members.

4. In a vehicle-frame the combination with the axles having lugs thereon, of a reach-frame having its ends abutting against the lugs, coöperating projections and recesses between the ends of the reach members and the proximate faces of the lugs, and securing devices projecting longitudinally through the latter and engaging the reach members.

5. In a vehicle-frame, the combination with the axles having the lugs thereon, of a swivel arranged between the axles composed of the separate pivoted members, forwardly and rearwardly extending reach members attached to the parts of the swivel provided at their outer extremities with recesses in which the lugs on the axles engage and securing devices passing through the lugs and engaging the interior of the reaches.

6. In a vehicle-frame, the combination with the axles, and the swivel located between them composed of the separate members, of the forwardly and rearwardly extending reach members threaded into the parts of the swivel and diverging therefrom and removable connections securing them at their outer extremities to the axles.

7. In a vehicle-frame, the combination with the axles, the heads or castings at their ends having the lugs, and threaded tapered connections between said parts, of the reach members having their ends abutting against the lugs, coöperating projections and recesses between the ends of the reaches and the faces of the lugs, and connections extending longitudinally through the latter and engaging the interior of the reaches.

8. In a vehicle-frame, the combination with the axles, the heads or castings at their ends having the lugs, threaded tapered connections between the axles and heads, and an enlarged box or casing provided in one of the axles, of the reach members extending between the axles having the recessed ends adapted to receive the lugs on the heads and provided with a threaded interior, and the bolts projecting longitudinally through the lugs and engaging the threaded interior of the reaches.

9. In a vehicle-frame the combination with the axles having tapered and threaded ends, the heads having the threaded apertures, and secured on the axles, and lugs formed on the heads, of a swivel composed of coöperating pivoted members having tapered and threaded recesses, reach members having tapered and threaded ends engaging the recesses in the swivel members and bolts extending longitudinally through the lugs on the axle-heads and engaging the interior of the reach members.

JAMES DAWSON.

Witnesses:
H. L. DAWSON,
G. WILLARD RICH.